(12) United States Patent
Li

(10) Patent No.: US 9,122,099 B2
(45) Date of Patent: Sep. 1, 2015

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Dehua Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 281 days.

(21) Appl. No.: 13/697,865

(22) PCT Filed: Oct. 12, 2012

(86) PCT No.: PCT/CN2012/082874
§ 371 (c)(1),
(2) Date: Nov. 14, 2012

(87) PCT Pub. No.: WO2014/056196
PCT Pub. Date: Apr. 17, 2014

(65) Prior Publication Data
US 2014/0098522 A1 Apr. 10, 2014

(30) Foreign Application Priority Data
Oct. 8, 2012 (CN) .......................... 2012 1 0377065

(51) Int. Cl.
*F21V 7/04* (2006.01)
*G02F 1/1333* (2006.01)
*G02F 1/1335* (2006.01)

(52) U.S. Cl.
CPC .... *G02F 1/133608* (2013.01); *G02F 1/133308* (2013.01); *G02F 2001/133317* (2013.01); *G02F 2201/46* (2013.01); *G02F 2201/465* (2013.01)

(58) Field of Classification Search
USPC ............ 362/97.1, 97.2, 97.3, 97.4, 632, 633, 362/634
See application file for complete search history.

(56) References Cited

U.S. PATENT DOCUMENTS

2012/0133845 A1* 5/2012 Ikuta ............................ 348/739

* cited by examiner

*Primary Examiner* — Meghan Dunwiddie
(74) *Attorney, Agent, or Firm* — Andrew C. Cheng

(57) ABSTRACT

The present invention provides a backlight module, which at least comprises: a liquid crystal panel and a backlight sheet. The back of the liquid crystal panel is provided with multiple fastening devices which are provided with a holding portion thereon. The backlight sheet is provided with an assembling portion corresponding to the holding portion thereon. The fastening devices fix the liquid crystal panel on the backlight sheet by latching the assembling portion to the holding portion. The present invention also discloses a liquid crystal display device comprising the backlight module structure mentioned above. The backlight module and the liquid crystal display device according to the present invention can realize the backlight module without frame or with narrow frame structure and improve the assembling efficiency.

16 Claims, 5 Drawing Sheets

BACKLIGHT MODULE AND LIQUID CRYSTAL DISPLAY DEVICE

This application claims priority to Chinese Patent Application Serial No. 201210377065.9, named as "backlight module and liquid crystal display device", filed on Oct. 8, 2012, the specification of which is incorporated herein by reference.

BACKGROUND OF THE INVENTION

1. Field of the Invention

The present invention relates to the field of liquid crystal display, and in particular to a backlight module and a liquid crystal display device.

2. The Related Arts

The liquid crystal display device comprises a display module. In order to display an image, backlight is needed to provide a light source. The main existing backlight source is selected from cold cathode fluorescent lamp (CCFL) and light emitting diode (LED). Currently, LED has become a new light source due to the advantages of small size, energy saving and easy to achieve the thin-shaped design of the backlight module. Hence, LED has gradually become the mainstream of the backlight source.

One of the existing liquid crystal display technology development is that the liquid crystal display device with narrow frame structure can provide a larger viewing angle within a limited space. How to narrow down the size of the outer frame of the liquid crystal display device or even without frame while the liquid crystal display panel and the backlight module are fixed reliably is the major problem which needs to be solved in the narrow frame technique.

SUMMARY OF THE INVENTION

The technical issue to be solved by the present invention is to provide a backlight module and a liquid crystal display device, which can realize the backlight module without frame or with narrow frame structure and improve the assembling efficiency.

To solve the above technical issue, the present invention provides a backlight module, at least comprising: a liquid crystal panel and a backlight sheet, wherein, the back of the liquid crystal panel is provided with multiple fastening devices which are provided with a holding portion thereon; the backlight sheet is provided with an assembling portion corresponding to the holding portion thereon, the fastening devices fix the liquid crystal panel on the backlight sheet by latching the assembling portion to the holding portion.

Wherein, the fastening devices comprise: a connecting plate, which is pasted on the back of the liquid crystal panel; the holding portion, which comprises a holding plate and a cover plate extending along the end of one side surface of the connecting plate, and the holding portion is parallel with the cover plate; wherein the backlight sheet comprises a backplane which comprises a bottom plate and multiple side plates, the assembling portion is provided at the ends of the multiple side plates and inserted in the grooves between the holding portion and the cover plate.

Wherein, the holding plate is provided with multiple slots which line of centers is parallel with the connecting plate; the multiple side plates are provided with a hooking portion, when the ends of the multiple side plates are inserted in the grooves between the holding portion and the cover plate, the hooking portion is latched to the corresponding slot.

Wherein, the holding plate and the cover plate respectively comprise two perpendicular intersected side plates which are perpendicular to the connecting plate.

Wherein, the height of the holding plate is higher than that of the cover plate.

Wherein, at least one side of the holding plate is provided with a notch.

Wherein, the fastening devices comprise: the connecting plate, which is pasted on the back of the liquid crystal panel; the holding portion, which comprises a holding column extending along the end of one side surface of the connecting plate; wherein, the backlight sheet comprises the backplane which comprises the bottom plate and multiple side plates, the assembling portion comprises a through hole provided at the corner of the bottom plate, and the holding column is inserted in the through hole.

Wherein, the holding column comprises multiple pawls provided parallel with each other, the ends part of the multiple pawl portions are bent toward the outside to form hooks; after the holding column is inserted throughout the through hole, the hooks are latched on the side surface of the bottom plate.

Wherein, the backlight sheet further comprises a frame, the fastening devices are provided inside the frame.

The present invention also provides a liquid crystal display device comprising the backlight module mentioned above The backlight module and the liquid crystal device according to the present invention provide multiple fastening devices on the back of the liquid crystal panel, the holding portion is provided on the fastening device, the fastening devices fix the liquid crystal panel on the backlight sheet by latching the assembling portion provided on the backlight sheet to the holding portion. By assembly fixing from the back of the liquid crystal panel, the use of the front frame can be omitted, and then realize the backlight module without frame or with narrow frame structure. Because the connecting plate is pasted on the back of the liquid crystal panel, when it needs to rework or replace the liquid crystal panel, only the liquid crystal panel together with the components of the fastening device need to be replaced or disassembled, which further improves the assembling efficiency.

DETAILED DESCRIPTION OF THE PREFERRED EMBODIMENTS

Figure 1:
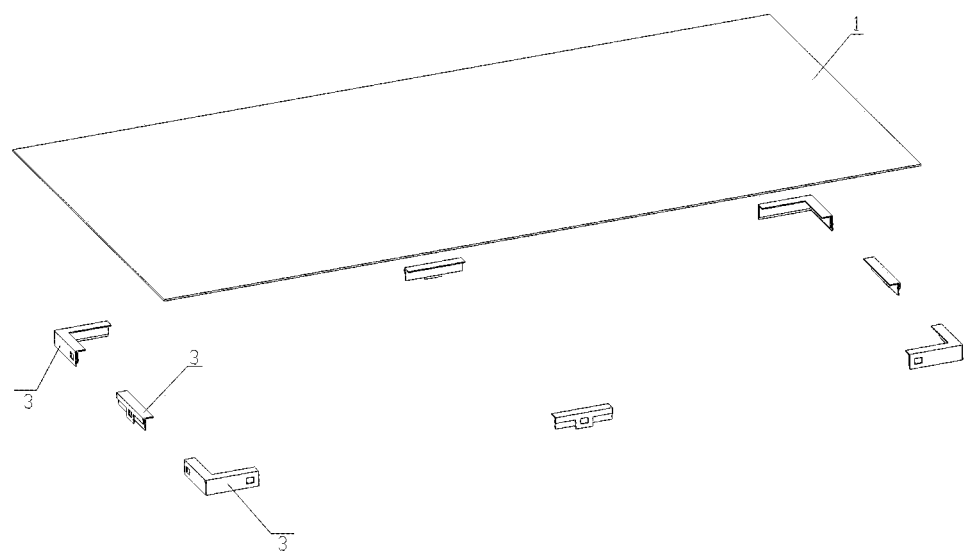
FIG. 1 is a schematic view illustrating the structure of the liquid crystal panel being assembled with the fastening devices of the first embodiment according to the present invention.
Figure 2:
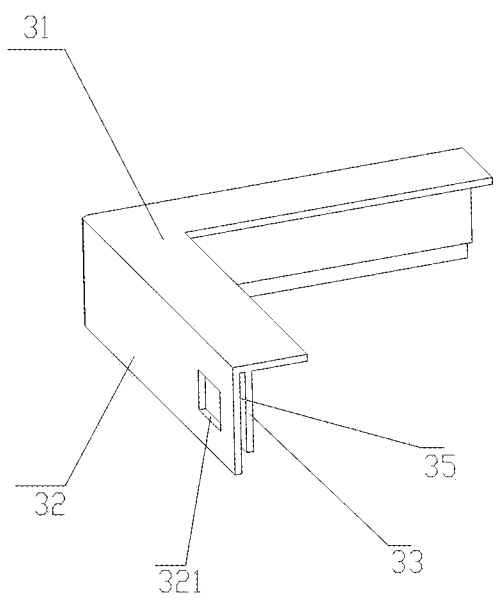
FIG. 2 is a schematic view illustrating the first structure of the fastening devices of the first embodiment according to the present invention.
Figure 3:
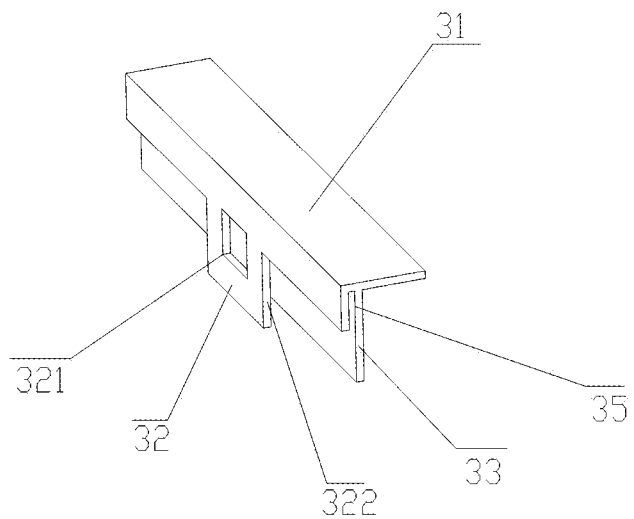
FIG. 3 is a schematic view illustrating the second structure of the fastening devices of the first embodiment according to the present invention.
Figure 4:
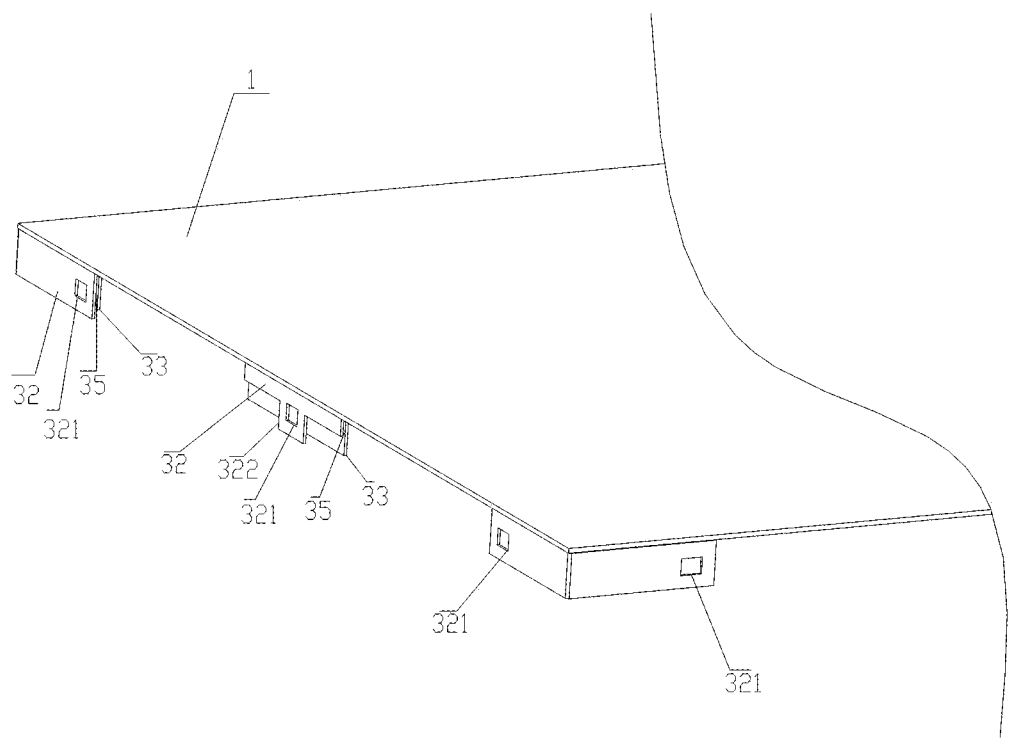
FIG. 4 is a schematic view illustrating the structure of the liquid crystal panel assembled with the fastening devices of the first embodiment according to the present invention.
Figure 5:
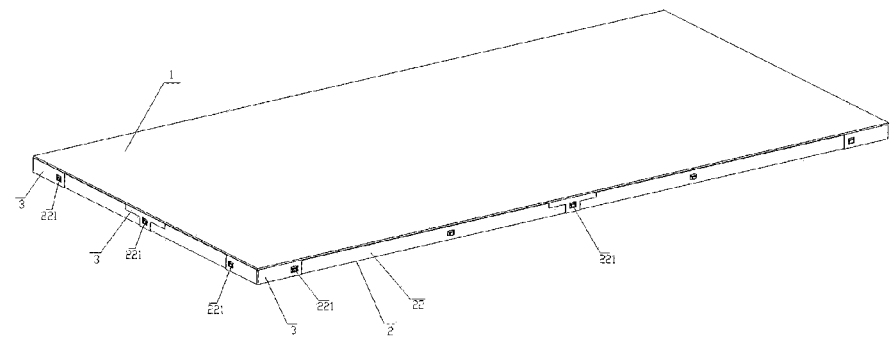
FIG. 5 is a schematic view illustrating the first structure of the backlight module of the first embodiment according to the present invention.
Figure 6:
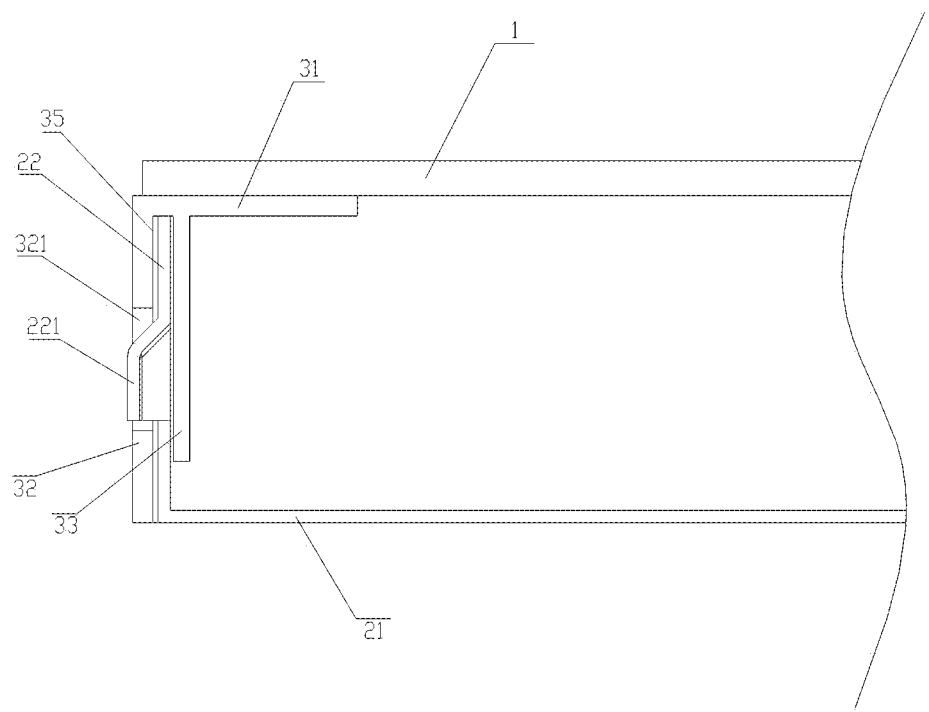
FIG. 6 is a schematic view illustrating the cross-sectional structure of the backlight module of the first embodiment according to the present invention.

The detailed descriptions according to the preferred embodiment of the present invention are as follows.

Referring to FIG. 1 to FIG. 6, they show the first embodiment of the backlight module according to the present invention.

The backlight module according to the present invention, which at least comprises: a liquid crystal panel 1, a backplane 2 and multiple fastening devices 3. The backplane 2 comprises a bottom plate 21 and multiple side plates 22, which is cuboidal. The size of the liquid crystal panel 1 is substantially the same as that of the backplane 2, which is a rectangular plate.

The fastening devices 3 are used to assembly fix the liquid crystal panel 1 and the backplane 2.

According to the assembly position of the fastening devices 3, the present embodiment is designed as two shapes. One of which is assembled at the edge of the corner of the liquid crystal panel 1 and the backplane 2, the other is assembled at the edge of the side end of the liquid crystal panel 1 and the backplane 2.

Both two shapes of the fastening devices 3 mentioned above have four parts, and each part comprises a connecting plate 31 and a holding portion.

Wherein, the connecting plate 31 is connected with the back of the liquid crystal panel 1 by pasting, which is angular or elongated strip plate.

The connecting plate 31 is pasted on the edge of the back of the liquid crystal panel 1.

The pasting position of the connecting plate 31 can be understood as the area of the back of the liquid crystal panel 1 corresponding to the side edges of the front display area of the liquid crystal panel 1. The pasting position is provided to make the connecting plate 31 not to block the visible area of the liquid crystal panel 1 and then improve the display quality of the liquid crystal module.

In the present embodiment, the holding portion comprises a holding plate 32 and a cover plate 33 parallel with each other. The holding plate 32 and the cover plate 33 respectively extend along the end of one side surface of the connecting plate and are perpendicular to the connecting plate 31. Grooves 35 used to mount multiple side plates 22 of the backplane 2 are provided between the holding plate 32 and the cover plate 33 which are parallel with each other.

Furthermore, the fastening devices 3 comprising the holding plate 32 and the cover plate 33 provided at the edge of the corner of the liquid crystal panel 1 and the backplane 2 consists of two perpendicular intersected side plates (not shown in Figure). The two side plates are perpendicular to the connecting plate 31, and the grooves 35 with corner are provided between the two side plates.

In the present embodiment, the assembling portion of the backplane 2 is provided at the end of the multiple side plates 22. The assembling portion matches with the holding portion and fixes both the fastening device 3 and the liquid crystal panel 1 on the backplane 2 by assembling.

While assembling, the sides of the multiple connecting plates 31 having flat plane are pasted on the edges of the back of the liquid crystal panel 1, and then the sides of the connecting plates 31 having the holding portion are inserted toward the side plates 22 on the backplane 2. The liquid crystal panel 1, the backplane 2 and the fastening devices 3 are fixed by latching the assembling portions to the holding portions.

When it needs to rework or replace the liquid crystal panel 1, only the liquid crystal panel 1 together with the components of the fastening devices 3 need to be replaced or disassembled, which further improves the assembling efficiency.

The meaning of the holding portion matching with the assembling portion is: after the fastening devices 3 are pasted on the liquid crystal panel 1, the contour of the grooves 35 provided between the holding plate 32 and the cover plate 33 on the multiple fastening devices 3 is the same as that of the side plates 22 around the backplane 2, which makes the ends of the side plates 22 able to be inserted and fixed in the grooves 35.

In the present embodiment, the holding plate 32 is provided with multiple slots 321 which line of centers is parallel with the connecting plate 31. The multiple side plates 22 are provided with a hooking portion 221.

When the ends of the multiple side plates 22 are inserted in the grooves 35 between the holding portion 32 and the cover plate 33, the hooking portion 221 is latched to the corresponding slot 321.

The hooking portion 221 and the slot 321 matched with each other are provided to increase the tightness between the liquid crystal panel 1 and the backplane 2, which improves the assembly reliability.

While the ends of the multiple side plates 22 is inserted toward the grooves 35, the end of the hooking portion 221 may form a slight deformation due to the extrusion of the grooves 35. It will recover after sliding into the slot 321 and then be latched into the slot 321.

The line of centers of the multiple slots 321 is provided parallel with the connecting plate 31, which is beneficial to rapidly be assembled with the backplane 2.

Furthermore, in the present embodiment, the height of the holding plate 32 is higher than that of the cover plate 33. The function of which is: after the fastening devices 3 are assembled with the backplane 2, the cover plate 33 occupies less space while the cover plate 33 still has covering function, which is beneficial to the thinning of the backlight module.

Furthermore, the holding plate 32 provided at the middle position of the side of backplane 2 and the liquid crystal panel 1 is provided with a notch 322. There are two notches 322 provided symmetrically at the left and right sides of the holding plate 32.

The function of the notch 322 is: the assembly personnel can quickly observe the assembly degree of the multiple side plates 22 and the grooves 35, which accelerates positioning.

Furthermore, in the present embodiment, the connecting plate 31 and the holding portion are integrated, which is beneficial to control cost and save the assembly time.

Furthermore, the materials of the connecting plate 31 and the holding portion can be selected from the common materials, such as PC, PMMA, ABS or metal materials.

Figure 7:
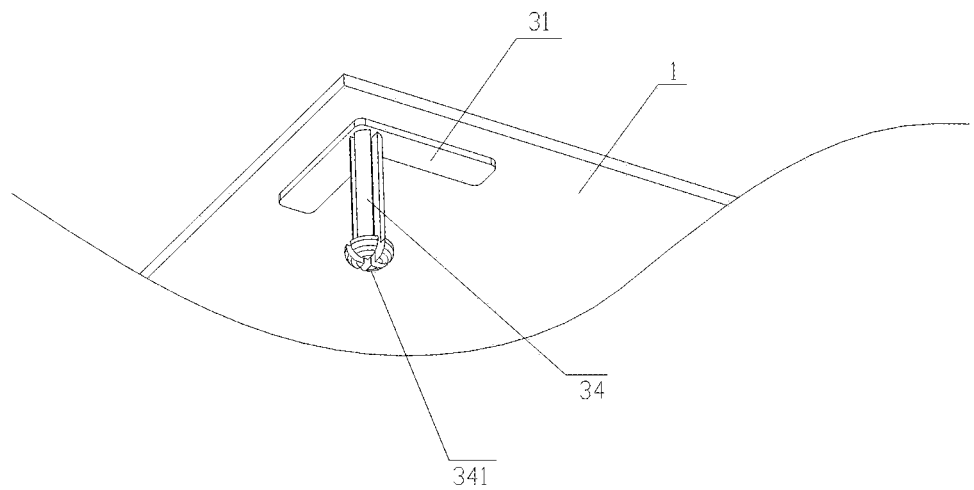
FIG. 7 is a schematic view illustrating the structure of the fastening devices of the second embodiment according to the present invention.
Figure 8:
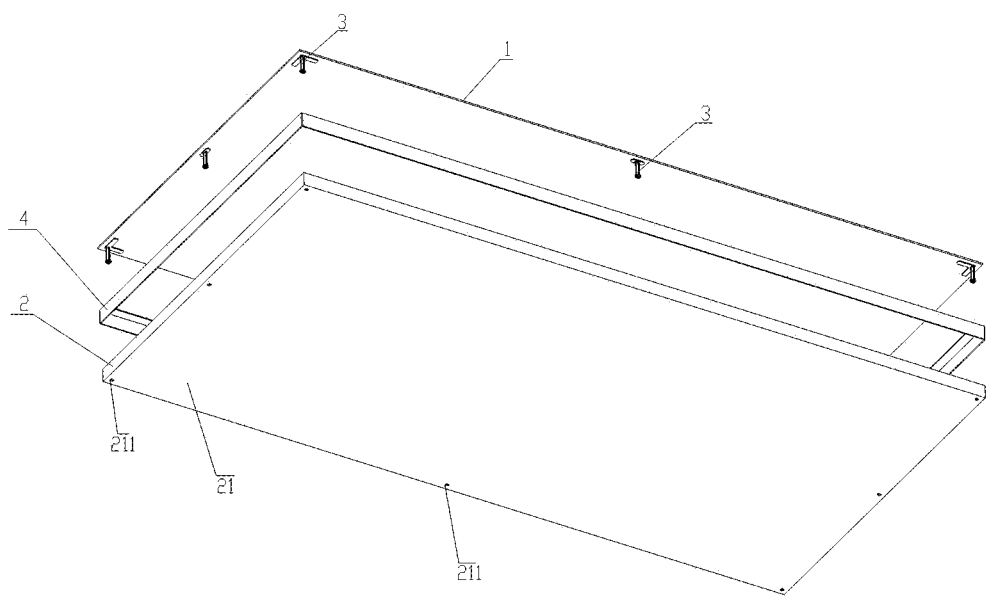
FIG. 8 is a schematic view illustrating the structure of the backlight module of the second embodiment according to the present invention.
Figure 9:
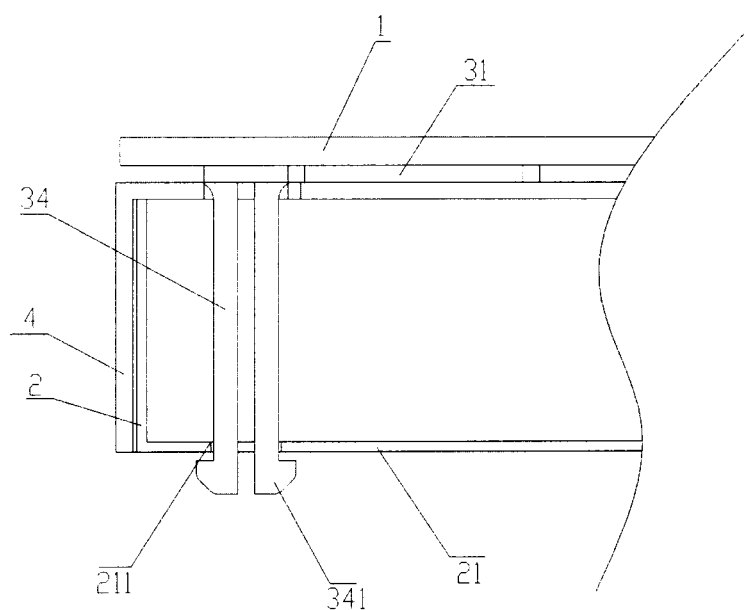
FIG. 9 is a schematic view illustrating the cross-sectional structure of backlight module of the second embodiment according to the present invention.

Referring to FIG. 7 to FIG. 9, they show the second embodiment of the backlight module according to the present invention.

The backlight module according to the present invention at least comprises a liquid crystal panel 1, a backplane 2 and fastening devices 3. The backplane 2 comprises a bottom plate 21 and multiple side plates 22.

The fastening devices 3 are used to assemble and fix the liquid crystal panel 1 and the backplane 2.

In the present embodiment, the fastening device 3 also comprises a connecting plate 31 and a holding portion, the difference with the first embodiment is: the holding portion in the present embodiment comprises a holding column 34 extending along the end of one side surface of the connecting plate 31.

The holding column 34 comprises multiple pawls provided parallel with each other. The multiple pawls are cylindrical. The ends of the multiple pawls away from the connecting plate 31 are bent toward the outside to form hooks 341. The hooks 341 is mushroom head shaped.

In the present embodiment, the backplane 2 comprises assembling portions provided in the position of four corners of the bottom plate 21, which are four through holes 211 with suitable diameter size for the multiple pawls.

The function of the through holes 211 is the same as that of the assembling portion mentioned in the above embodiment, which is used to match with the holding columns 34. The fastening device 3 together with the liquid crystal panel 1 can be fixed on the backplane 2 by assembling.

While assembling, the sides of the multiple connecting plates 31 having flat plane are pasted on the edges of the back of the liquid crystal panel 1, and then the sides of the connecting plates 31 having the holding columns 34 are inserted toward the bottom plates 21 on the backplane 2. After the holding columns 34 are inserted throughout the through holes 211, the mushroom head shaped hooks 341 are latched on the side surface of the bottom plate 21.

Similarly, there are gaps within the multiple pawls parallel with each other. While assembling, the hooks 341 may form a slight deformation due to the extrusion of the inner wall of the through holes 211. It will recover after sliding into the through holes 211 and then be latched on the side surface of the bottom plate 21.

In the present embodiment, a frame 4 can be further provided between the liquid crystal panel 1 and the backplane 2. After assembling, the liquid crystal panel 1 and the backplane 2 are pressed against the upper and lower ends of the frame 4, as shown in Figures. The frame 4 has the functions of supporting and fixing.

In the backlight module structure assembled with the frame 4, the fastening devices 3 are provided inside the frame 4.

Among the other embodiments of the backlight module according to the present invention, the connecting plate can be fixed on the back of the liquid crystal panel by using the other connection method in addition to the pasting method according to the requirements of the actual assembly, such as latching connection.

The shape, fitting position and quantity of the connecting plates can be adjusted according to the size of the actual assembly of the liquid crystal panel. And, it is not limited to the angular shape or the elongated strip plate structure as mentioned above, as long as the connecting plate is located at the back of the liquid crystal panel and would not block the viewable area of the LCD panel after assembling.

It can also let the fastening device comprising the holding portion be latched on the other backlight sheet. The fixing equipment 3 together with the liquid crystal panel 1 can be fixed on the backlight sheet by assembling. Only the assembling portion needs to be provided corresponding to the backlight sheet. For example, the backlight sheet can be the frame in the backlight module.

The present invention also discloses a liquid crystal display device having the backlight module structure as mentioned above. The description of embodiment is the same as that of the above embodiment of the backlight module structure and not be repeated here.

The advantages of the backlight module and the liquid crystal display device according to the present invention are as follows: there are multiple fastening devices provided on the back of the liquid crystal panel, the holding portion is provided on the fastening device, and the fastening devices fix the liquid crystal panel on the backlight sheet by latching the assembling portion provided on the backlight sheet to the holding portion. By assembly fixing from the back of the liquid crystal panel, the use of the front frame can be omitted, and then realize the backlight module without frame or with narrow frame structure. Because the connecting plate is pasted on the back of the liquid crystal panel, when it needs to rework or replace the liquid crystal panel, only the liquid crystal panel together with the components of the fastening device need to be replaced or disassembled, which further improves the assembling efficiency.

What is claimed is:

1. A backlight module, at least comprising:
a liquid crystal panel and a backlight sheet, wherein, the back of the liquid crystal panel is provided with multiple fastening devices which are provided with a holding portion thereon;
the backlight sheet is provided with an assembling portion corresponding to the holding portion thereon, the fastening devices fix the liquid crystal panel on the backlight sheet by latching the assembling portion to the holding portion;
wherein, the fastening devices comprise:
a connecting plate, which is pasted on the back of the liquid crystal panel;
the holding portion which comprises a holding plate and a cover plate extending along the end of one side surface of the connecting plate, and the holding portion is parallel with the cover plate;
wherein, the backlight sheet comprises a backplane which comprises a bottom plate and multiple side plates, the assembling portion is provided at the ends of the multiple side plates and inserted in grooves between the holding portion and the cover plate.

2. The backlight module as claimed in claim 1, wherein the holding plate is provided with multiple slots which line of centers is parallel with the connecting plate; the multiple side plates are provided with a hooking portion, when the ends of the multiple side plates are inserted in the grooves between the holding portion and the cover plate, the hooking portion is latched to the corresponding slot.

3. The backlight module as claimed in claim 1, wherein the holding plate and the cover plate respectively comprise two perpendicular intersected side plates which are perpendicular to the connecting plate.

4. The backlight module as claimed in claim 3, wherein the height of the holding plate is higher than that of the cover plate.

5. The backlight module as claimed in claim 3, wherein at least one side of the holding plate is provided with a notch.

6. The backlight module as claimed in claim 1, wherein the fastening devices comprise:
the connecting plate, which is pasted on the back of the liquid crystal panel;
the holding portion, which comprises a holding column extending along the end of one side surface of the connecting plate;
wherein, the backlight sheet comprises the backplane which comprises the bottom plate and multiple side plates, the assembling portion comprises a through hole provided at the corner of the bottom plate, and the holding column is inserted in the through hole.

7. The backlight module as claimed in claim 6, wherein the holding column comprises multiple pawls provided parallel with each other, the ends part of the multiple pawls are bent toward the outside to form hooks;
after the holding column is inserted throughout the through hole, the hooks are latched on the side surface of the bottom plate.

8. The backlight module as claimed in claim 1, wherein the backlight sheet further comprises a frame, the fastening devices are provided inside the frame.

9. A liquid crystal display device, which comprises a backlight module, wherein, the backlight module at least comprises a liquid crystal panel and a backlight sheet, wherein the back of the liquid crystal panel is provided with multiple fastening devices which are provided with a holding portion thereon;
the backlight sheet is provided with an assembling portion corresponding to the holding portion thereon, the fastening devices fix the liquid crystal panel on the backlight sheet by latching the assembling portion to the holding portion;
wherein, the fastening devices comprise:
a connecting plate, which is pasted on the back of the liquid crystal panel;
the holding portion which comprises a holding plate and a cover plate extending along the end of one side surface of the connecting plate, and the holding portion is parallel with the cover plate;
wherein, the backlight sheet comprises a backplane which comprises a bottom plate and multiple side plates, the assembling portion is provided at the ends of the multiple side plates and inserted in grooves between the holding portion and the cover plate.

10. The liquid crystal display device as claimed in claim 9, wherein the holding plate is provided with multiple slots which line of centers is parallel with the connecting plate; the multiple side plates are provided with a hooking portion, when the ends of the multiple side plates are inserted in the grooves between the holding portion and the cover plate, the hooking portion is latched to the corresponding slot.

11. The liquid crystal display device as claimed in claim 9, wherein the holding plate and the cover plate respectively comprise two perpendicular intersected side plates which are perpendicular to the connecting plate.

12. The liquid crystal display device as claimed in claim 11, wherein the height of the holding plate is higher than that of the cover plate.

13. The liquid crystal display device as claimed in claim 11, wherein at least one side of the holding plate is provided with a notch.

14. The liquid crystal display device as claimed in claim 9, wherein the fastening devices comprise:
the connecting plate, which is pasted on the back of the liquid crystal panel;
the holding portion, which comprises a holding column extending along the end of one side surface of the connecting plate;
wherein, the backlight sheet comprises the backplane which comprises the bottom plate and multiple side plates, the assembling portion comprises a through hole provided at the corner of the bottom plate, and the holding column is inserted in the through hole.

15. The liquid crystal display device as claimed in claim 14, wherein the holding column comprises multiple pawls provided parallel with each other, the ends part of the multiple pawl portions are bent toward the outside to form hooks;
after the holding column is inserted throughout the through hole, the hooks are latched on the side surface of the bottom plate.

16. The liquid crystal display device as claimed in claim 9, wherein the backlight sheet further comprises a frame, the fastening devices are provided inside the frame.

* * * * *